United States Patent
Shimamura et al.

(10) Patent No.: US 7,555,322 B2
(45) Date of Patent: Jun. 30, 2009

(54) FOLDABLE TYPE PORTABLE INFORMATION TERMINAL, CONDITION NOTIFYING METHOD USED IN THE SAME AND PROGRAM THEREFOR

(75) Inventors: Masaki Shimamura, Tokyo (JP); Mika Fujii, Tokyo (JP); Mitio Nagai, Tokyo (JP); Kazuo Ootuta, Tokyo (JP); Kiyosi Kohayakawa, Tokyo (JP); Masatomo Mizuta, Tokyo (JP)

(73) Assignee: NEC Corporation, Tokyo (JP)

( * ) Notice: Subject to any disclaimer, the term of this patent is extended or adjusted under 35 U.S.C. 154(b) by 718 days.

(21) Appl. No.: 10/378,951

(22) Filed: Mar. 5, 2003

(65) Prior Publication Data
US 2003/0228880 A1 Dec. 11, 2003

(30) Foreign Application Priority Data
Mar. 6, 2002 (JP) ............................. 2002-059643

(51) Int. Cl.
*H04M 1/00* (2006.01)
(52) U.S. Cl. .................. 455/575.3; 455/567; 455/226.4
(58) Field of Classification Search ... 455/575.1–575.9, 455/226.1–226.4, 566, 90.1, 567; 379/433.13
See application file for complete search history.

(56) References Cited

U.S. PATENT DOCUMENTS

| | | | |
|---|---|---|---|
| 5,404,582 A * | 4/1995 | Demuro et al. .......... | 455/575.3 |
| 5,448,620 A * | 9/1995 | Gershkovich et al. ....... | 455/567 |
| 5,495,517 A * | 2/1996 | Ide et al. ...................... | 455/567 |
| 6,073,033 A * | 6/2000 | Campo ........................ | 455/566 |
| 6,134,455 A * | 10/2000 | Corkum ...................... | 455/567 |
| 6,198,934 B1 * | 3/2001 | Ohtsuki .................... | 455/226.1 |
| 6,522,878 B1 * | 2/2003 | Andrews et al. ............ | 455/425 |
| 6,549,789 B1 * | 4/2003 | Kfoury ...................... | 455/550.1 |
| 6,807,275 B1 * | 10/2004 | Kubo et al. ............ | 379/433.04 |
| 7,395,069 B2 * | 7/2008 | Laakso et al. ............ | 455/452.2 |
| 2002/0006785 A1 * | 1/2002 | Ohtsuki ...................... | 455/414 |
| 2002/0028662 A1 * | 3/2002 | Yoshinaga ................... | 455/90 |

FOREIGN PATENT DOCUMENTS

| | | |
|---|---|---|
| GB | 2 337 899 | 12/1999 |
| GB | 2 377 594 A | 1/2003 |
| JP | 11-30226 | 2/1999 |
| JP | 11-103273 | 4/1999 |
| JP | 11-215218 | 8/1999 |
| JP | 2001-251406 | 9/2001 |
| JP | 2001-320463 | 11/2001 |
| JP | 2002-16682 | 1/2002 |

* cited by examiner

*Primary Examiner*—Lana N Le
(74) *Attorney, Agent, or Firm*—Dickstein Shapiro LLP

(57) ABSTRACT

A foldable type portable information terminal can accurately recognize operation mode in a construction having various of functions and various relative attitudes. The portable information terminal includes the upper unit having the display screen in either of the upper or lower surfaces and the lower unit having the operation surface in either upper or lower surfaces coupled for opening and closing and for pivoting. The portable information terminal has a detector which detects variation of relative attitude of the upper unit and the lower unit, for externally announcing variation of relative attitude of the upper unit and the lower unit as detected by the detector.

13 Claims, 6 Drawing Sheets

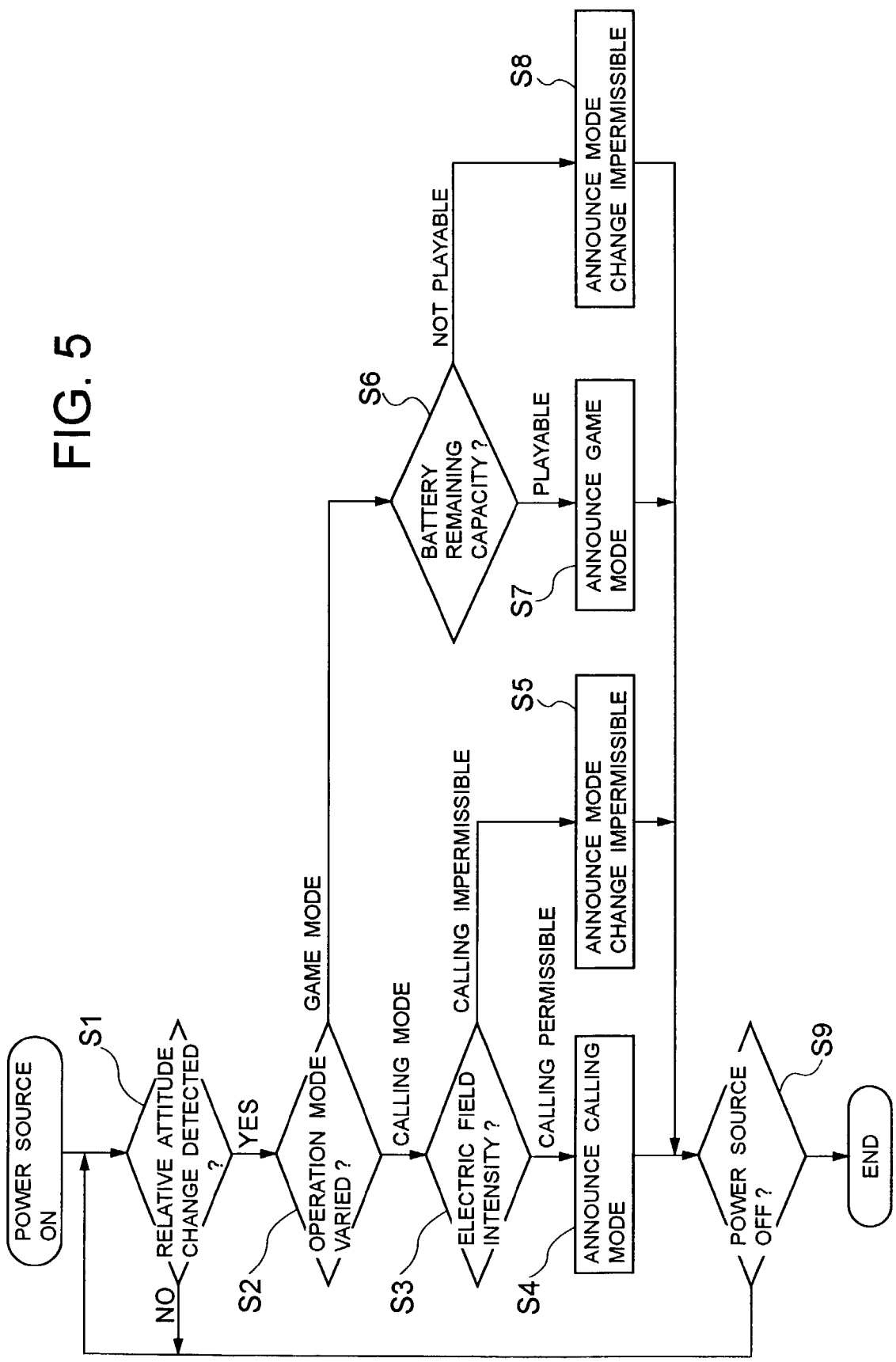

FOLDABLE TYPE PORTABLE INFORMATION TERMINAL, CONDITION NOTIFYING METHOD USED IN THE SAME AND PROGRAM THEREFOR

CROSS REFERENCE TO THE RELATED APPLICATION

The present application has been filed with claiming priority based on Japanese Patent Application No. 2002-059643, filed on Mar. 6, 2002. Disclosure of the above-identified Japanese Patent Application is herein incorporated by reference. The present invention is related to Japanese Patent Application No. 2002-059644, filed on Mar. 6, 2002 and U.S. Patent Application filed with claiming priority based Japanese Patent Application No. 2002-059644. Disclosure of the above-identified related applications are herein incorporated by reference.

BACKGROUND OF THE INVENTION

1. Field of the Invention

The present invention relates generally to a foldable type portable information terminal, a condition notifying method used in the same and a program therefor. More particularly, the invention relates to a foldable type portable information terminal, in which an upper unit and a lower unit are coupled for opening and closing and for pivoting.

2. Description of the Related Art

Conventionally, among portable information terminals, particularly cellular telephone units, foldable type terminals or units have been widely preferred for capability of storage in compact and for capability of prevention of erroneous key operation on operating portions in comparison with straight type terminals or units to gain increasing demand.

On the other hand, in case of the cellular telephone units, terminals provided not only normal calling function but also browser function for browsing internet web page or the like, function as transmitting and receiving terminal of electronic mail, function of schedule management and so on. For the functions set forth above, enlarging of display is progressed for facilitating display of large amount of character information, graphic image and so on.

However, in case of the foregoing foldable type cellular telephone unit, shortcoming is encountered in vexatious complication in opening and closing the upper and lower units, constraint for vertically elongated display (constraint in number of display characters in lateral one line or in displaying laterally elongated image), constraint in design and so forth.

In order to solve these problem, there has been proposed a foldable type cellular telephone unit, in which the upper unit and the lower unit are coupled for providing capability not only for opening and closing of the upper unit and the lower unit and for pivoting relative to each other for convenience. For example, the foldable type cellular telephone unit of this kind is disclosed in Japanese Unexamined Patent Publication No. Heisei 11(1999)-30226, Japanese Unexamined Patent Publication No. Heisei 11(1999)-215218, and so forth.

However, in the foregoing foldable type portable information terminal, convenience is improved by providing capability not only for opening and closing of the upper unit and the lower unit and for pivoting relative to each other, the upper and lower units are placed in various attitude relative to each other. Therefore, when the upper and lower units are pivoted with each other, difficulty is encountered in instantly checking whether the attitude condition of the upper and lower units is adapted to an operation mode desired to use by a user.

For example, when the foldable type portable information terminal is used in a mode where the upper and lower units are pivoted to place the display portion in laterally elongated attitude for watching browser, reading electronic mail or playing game and so forth, even if the upper and lower units are pivoted to transit to calling mode, it is not possible to instantly check whether the current attitude of the upper and lower units is adapted to calling mode. In such case, the upper unit and the lower unit have to be pivoted up to the attitude adapted to the calling mode with checking at respective pivoting positions.

SUMMARY OF THE INVENTION

The present invention has been worked out in view of the shortcoming set forth above. It is therefore an object of a foldable type portable information terminal, a condition notifying method used in the same and a program thereof, which can accurately recognize operation mode in a construction having various of functions and various relative attitudes.

According to the first aspect of the present invention, a foldable type portable information terminal the upper unit having the display screen in either of the upper or lower surfaces and the lower unit having the operation surface in either upper or lower surfaces are coupled for opening and closing and for pivoting, comprises:

detecting means for detecting variation of relative attitude of the upper unit and the lower unit; and announcing means for externally announcing variation of relative attitude of the upper unit and the lower unit as detected by the detecting means.

The foldable type portable information terminal may further comprises operation mode judgment means for detecting variation of operation mode of own terminal, and the announcing means performs external announcement when variation of relative attitude of the upper unit and the lower unit is detected by the detecting means and variation of operation mode is detected. The foldable type portable information terminal may further comprise battery remaining capacity detecting means for detecting remaining capacity of a battery of the own terminal, and the announcing means performs external announcement depending upon remaining capacity of the battery for the operation mode when variation of relative attitude of the upper unit and the lower unit is detected by the detecting means and variation of operation mode is detected. The foldable type portable information terminal may further comprise electric field intensity detecting means for detecting communication condition of the own terminal, the announcing means performs external announcement depending upon the communication condition for the operation mode when variation of relative attitude of the upper unit and the lower unit is detected by the detecting means and variation of operation mode is detected.

The foldable type portable information terminal may further comprises timer means for measuring a time, and the announcing means may perform announcement based on time information output by the timer means. The announcing means may perform announcement by at least one of light, sound and vibration.

According to the second aspect of the present invention, a condition announcing method for a foldable type portable information terminal the upper unit having the display screen in either of the upper or lower surfaces and the lower unit having the operation surface in either upper or lower surfaces are coupled for opening and closing and for pivoting, comprises:

detecting step of detecting variation of relative attitude of the upper unit and the lower unit; and announcing step of externally announcing variation of relative attitude of the upper unit and the lower unit as detected by the detecting means.

The condition announcing method may further comprises operation mode judgment step of detecting variation of operation mode of own terminal, and in the announcing step, external announcement is performed when variation of relative attitude of the upper unit and the lower unit is detected by the detecting means and variation of operation mode is detected. The condition announcing method may comprise battery remaining capacity detecting step of detecting remaining capacity of a battery of the own terminal, and in the announcing step, external announcement is performed depending upon remaining capacity of the battery for the operation mode when variation of relative attitude of the upper unit and the lower unit is detected by the detecting means and variation of operation mode is detected. The condition announcing method may further comprise electric field intensity detecting step of detecting communication condition of the own terminal, in the announcing step, external announcement is performed depending upon the communication condition for the operation mode when variation of relative attitude of the upper unit and the lower unit is detected by the detecting means and variation of operation mode is detected.

The condition announcing method may further comprises timer step of measuring a time, and in the announcing step, announcement is performed based on time information output by the timer step. In the announcing step, announcement may be performed by at least one of light, sound and vibration.

According to the third aspect of the present invention, a program for condition announcing method for a foldable type portable information terminal the upper unit having the display screen in either of the upper or lower surfaces and the lower unit having the operation surface in either upper or lower surfaces are coupled for opening and closing and for pivoting, comprises:

detecting step of detecting variation of relative attitude of the upper unit and the lower unit; and announcing step of externally announcing variation of relative attitude of the upper unit and the lower unit as detected by the detecting means.

According to the fourth aspect of the present invention, a foldable type cellular telephone unit the upper unit having the display screen in either of the upper or lower surfaces and the lower unit having the operation surface in either upper or lower surfaces are coupled for opening and closing and for pivoting, comprises:

detecting means for detecting variation of relative attitude of the upper unit and the lower unit; and announcing means for externally announcing variation of relative attitude of the upper unit and the lower unit as detected by the detecting means.

Namely, the foldable type portable information terminal according to the present invention is characterized in that the upper unit and the lower unit are coupled for opening and closing and for pivoting, and has the announcing means for detecting opening and closing or pivoting motion of the upper unit and the lower unit.

By this, in the foldable type portable information terminal according to the present invention, opening and closing or pivoting motion of the upper unit and the lower unit can be detected to announce whether the relative attitude is adapted to the desired operation mode to permit appropriate recognition of the operation mode in the construction having various functions and various conditions (attitudes)

BRIEF DESCRIPTION OF THE DRAWINGS

The present invention will be understood more fully from the detailed description given hereinafter and from the accompanying drawings of the preferred embodiment of the present invention, which, however, should not be taken to be limitative to the invention, but are for explanation and understanding only.

In the drawings:

FIG. 5 is a flowchart showing example of operation of a control portion of FIG. 1.

DESCRIPTION OF THE PREFERRED EMBODIMENT

The present invention will be discussed hereinafter in detail in terms of the preferred embodiment of a foldable type portable information terminal, a condition notifying method to be used in the same, and a program therefor, according to the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to avoid unnecessary obscurity of the present invention.

Figure 1:
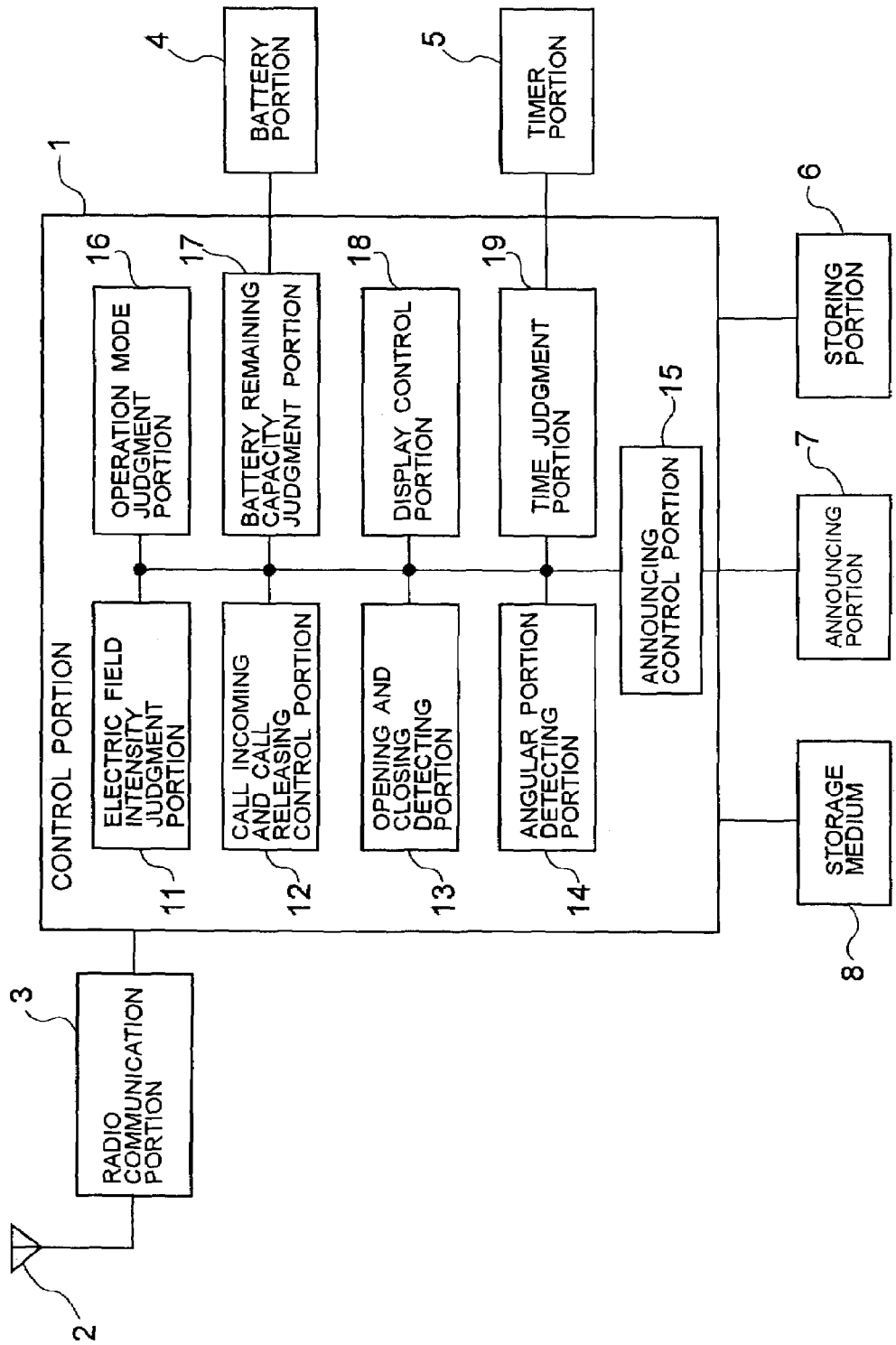
FIG. 1 is a block diagram showing a construction of one embodiment of a portable information terminal according to the present invention.

FIG. 1 is a block diagram showing a schematic construction of one embodiment of a portable information terminal according to the present invention. In FIG. 1, one embodiment of the portable information terminal according to the present invention is constructed with a control portion 1, an antenna 2, a radio communication portion 3, a battery portion 4, a timer portion 5, a storage portion 6, an announcing portion 7 and a storage medium 8. While not illustrated in FIG. 1, an upper unit and a lower unit are coupled for opening and closing motion and for pivoting motion. In the storage portion 6, sound, schedule, image, a telephone book and various setting information, contends (application program) and so forth are stored.

The control portion 1 is constructed with an electric field intensity judgment means 11, a call incoming and call releasing control portion 12, an opening and closing detecting portion 13, a angular position detecting portion 14, an announcing control portion 16, an operation mode judgment portion 16, a battery remaining capacity judgment portion 17, a display control portion 18 and a time judgment portion 19. On the other hand, the control portion 1 is mainly constructed with a computer. Respective functions expressed in a form of function blocks will be realized by executing the program stored in the storage medium by the computer.

The electric field intensity judgment portion 11 makes judgment of a reception electric field intensity via the radio communication portion 3. The call incoming and call releasing control portion 12 enables call incoming control operation corresponding to opening and closing operation and pivoting operation of the upper unit.

The opening and closing detecting portion 13 detects opening and closing condition of the upper unit and discriminates normal state (surface) and reversed state (back) of the upper unit relative to the lower unit. The angular position detecting portion 14 makes judgment of angular position of the upper unit on the basis of outputs of various sensors (not shown).

The announcing control portion 15 can control announcing operation upon call incoming corresponding to opening and closing operation and pivoting operation of the upper unit. The announcing control portion 15 announces variation of relative position (relative attitude) of the lower unit and the upper unit by at least one of a display 54, an auxiliary display 55, a speaker 51 and the announcing portion 7 (vibrator, LED (light emitting diode), speaker and so forth) depending upon result of judgment by the electric field intensity judgment portion 11, the operation mode judgment portion 16, the battery remaining capacity judgment portion 17, the time judgment portion 19 and so forth when the relative position of the lower unit and the upper unit is detected by the opening and closing detecting portion 13 or the angular position detecting portion 14 via a magnetic sensor and magnet.

The operation mode judgment portion 16 makes judgment of operation mode (calling, playing game, contents reproduction and so forth) of own terminal. The battery remaining capacity judgment portion 17 makes judgment of battery remaining capacity of the battery portion 4. The display control portion 18 controls a display content and orientation of display content reflecting output of the angular position detecting portion 14 and opening and closing detecting portion 13.

The time judgment portion 19 makes judgment of a current time based on an output of the timer portion 5. In the alternative, the timer function may be provided in the control portion 1.

Figure 2:
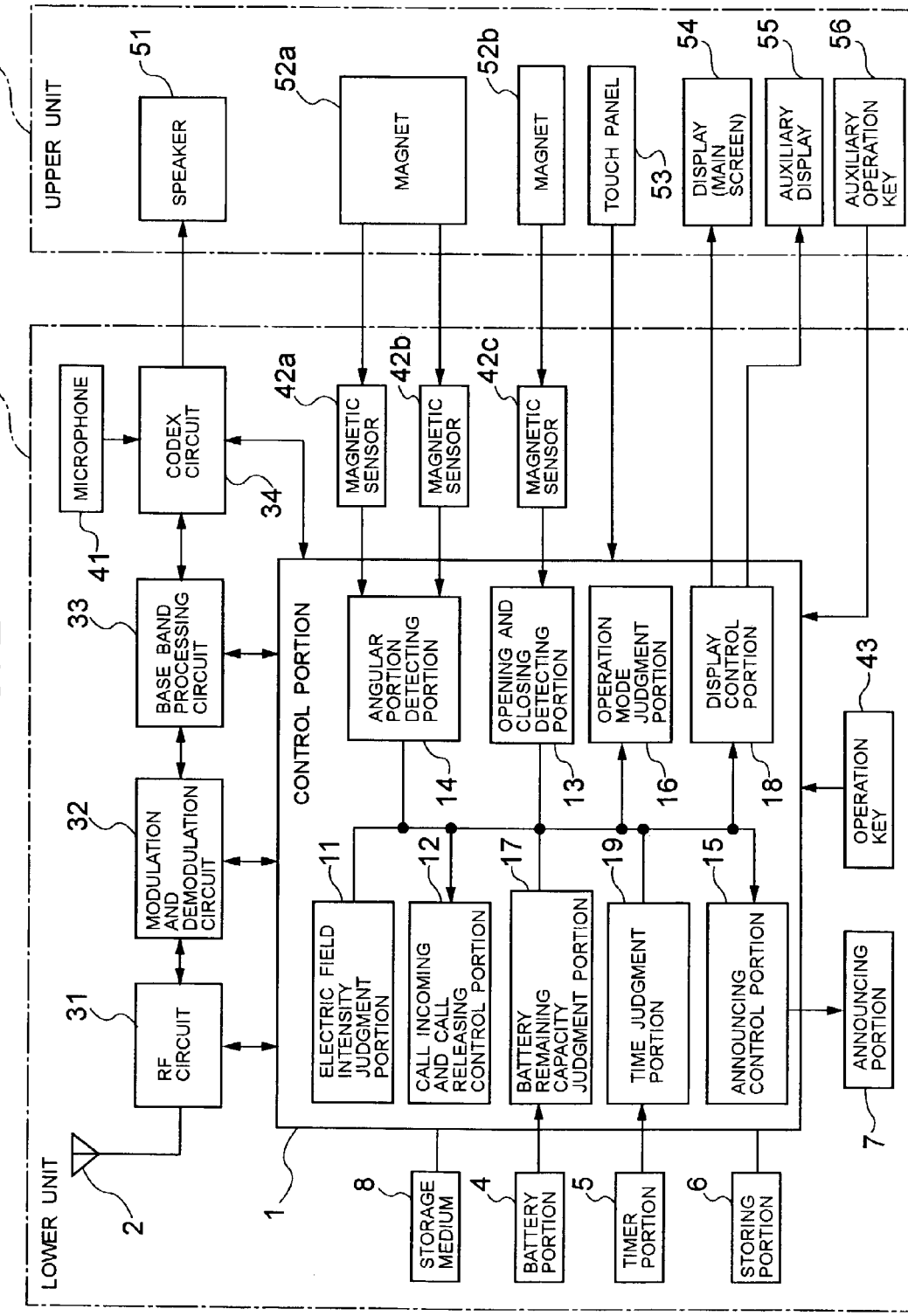
FIG. 2 is a block diagram showing a detailed construction of one embodiment of the portable information terminal according to the invention.

FIG. 2 is a block diagram showing a detailed construction of one embodiment of the portable information terminal according to the present invention. In FIG. 2, the lower unit is identified by the reference numeral 40 and the upper unit is identified by the reference numeral 50. As set forth above, the lower unit 40 and the upper unit 50 are coupled for permitting opening and closing motion and pivoting motion.

In the lower unit 40, the antenna 2, an RF circuit 31, a modulation and demodulation circuit 32, a base band processing circuit 33, a codec circuit 34, the control portion 1, a microphone 41, an operation key 43, the battery portion 4, the timer portion 5, the storage portion 6, the announcing portion 7, the storage medium 8 and three magnetic sensors 42a to 42c for detecting position of the upper unit 50 (attitude relative to the lower unit 40).

It should be noted that the RF circuit 31 has not shown receiver circuit, a transmitter circuit and a frequency synthesizer. Operation keys 43 forming the operating portion are consisted of known send key, character/figure conversion keys, power source ON/OFF key, crisscross key for performing cursor operation, end key and so forth.

On the other hand, in the upper unit 50, a speaker 51, a magnet 52a arranged corresponding to the magnetic sensors 42a and 42b, a magnet 52b corresponding to the magnetic sensor 42c, a display (liquid crystal display) 54 serving as primary display screen, a touch panel mechanism 53 incorporated on the surface of the display 54, an auxiliary display 55 and an auxiliary operation key 56 are provided. It should be noted that the speaker 51 functions as a telephone receiver and also serves as the announcing portion 7.

The lower unit 40 and the upper unit 50 may take various relative positions (relative attitudes) as required. The magnet sensor group consisted of magnetic sensors 42a to 42c and magnet group consisted of magnets 52a and 52b detect relative positions of the lower unit 40 and the upper unit 50.

Figure 3:
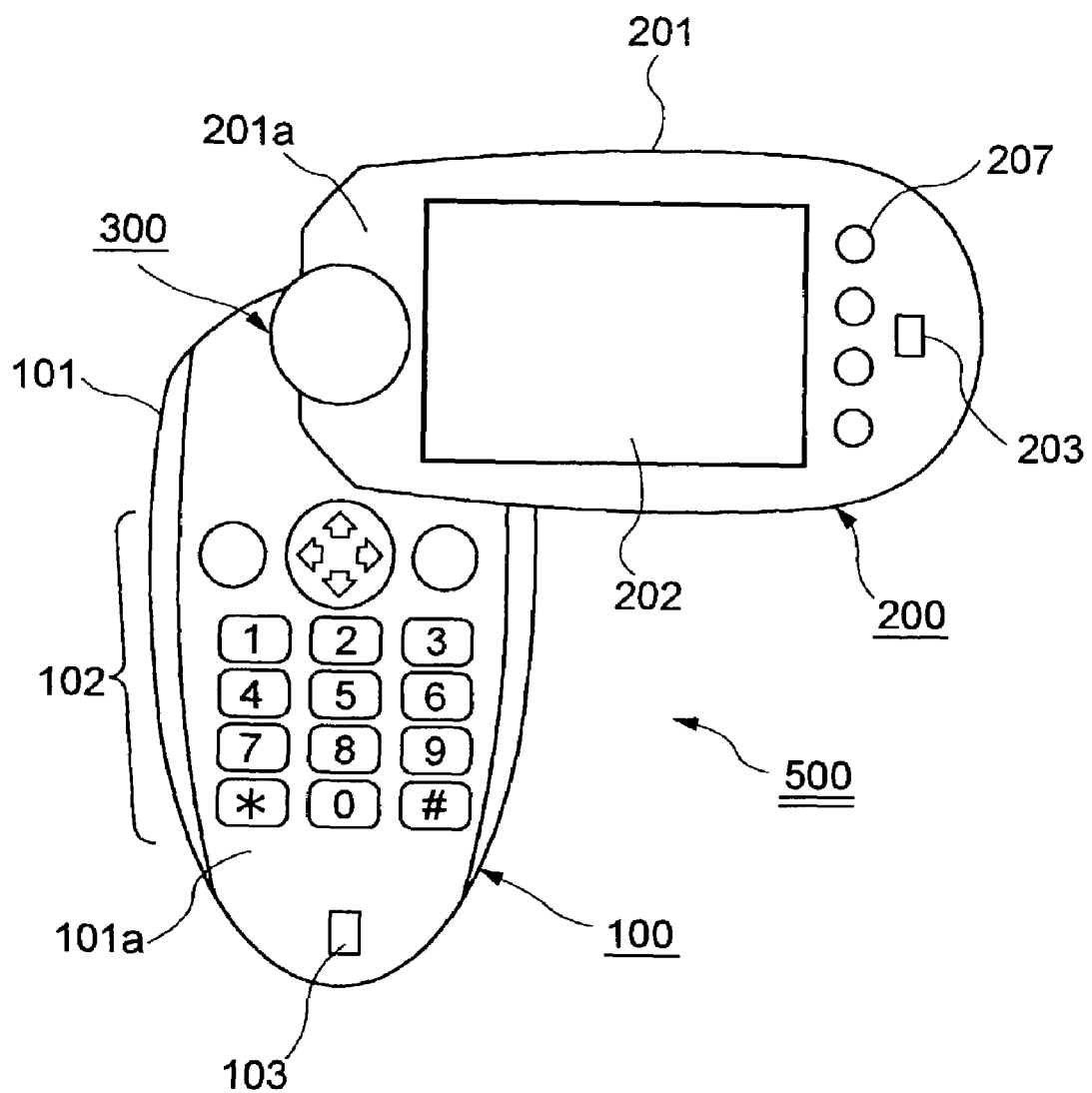
FIG. 3 is an external view of a cellular telephone unit applicable as one embodiment of the portable information terminal according to the invention.

FIG. 3 is an external view of a cellular telephone unit applicable as one embodiment of the portable information terminal according to the invention. FIGS. 4A to 4D are illustration showing various pivoted condition of the portable information terminal shown in FIG. 3. FIG. 3 shows a condition where an upper unit 200 is reversed to direct a display surface 202 outward and is laterally pivoted.

In FIG. 3, the cellular telephone unit 500 is mainly constructed with a lower unit 100 having an operating portion and an upper unit 200 having a display portion 202, and a biaxial hinge 300 serving as a universal hinge or joint portion pivotably and rotatably coupling the lower unit 100 and the upper unit 200. The lower unit 100 corresponds to the lower unit 40 shown in FIG. 2, and the upper unit 200 corresponds to the upper unit 50 shown in FIG. 2.

The lower unit 100 and the upper unit 200 are essentially elliptic shape of substantially equal size, flat and predetermined thickness, and are mechanically coupled via the biaxial hinge 300. Thus, the upper unit 200 is pivotable and rotatable relative to the lower unit 100 about the biaxial hinge 300. On the other hand, the lower unit 100 and the upper unit 200 are electrically connected across the biaxial hinge 300 by means of an appropriate connection means (not shown).

Within an outer casing 101 of the lower unit 100, a construction of the lower unit 40 shown in FIG. 2 is housed or mounted. On one surface (operation surface) 101a of the lower unit 100, the operating portion formed with a plurality of operation keys 102 for using functions provided for the cellular telephone unit 500, is arranged. Furthermore, an opening portion of a microphone 103 is arranged at a tip end portion of the operation surface 101a.

On the other hand, in the vicinity of a base end portion of the operation surface 101a, a rotary shaft is rotatably secured at a substantially lateral center position distanced from an edge portion on the base end side of the lower unit 100 by a predetermined distance (substantially half of a thickness of the upper unit 200 and extended substantially perpendicular to the operation surface 101a with projecting a tip end thereof from the operation surface 101a.

Within an outer casing 201 of the upper unit 200, a construction of the upper unit 50 shown in FIG. 2 is housed or mounted. On one surface (display surface) 201a of the upper unit 200, a substantially rectangular display 202 is arranged in longitudinally elongated fashion in the normal state. On the other hand, a speaker 203 is arranged at a tip end portion. On the other hand, on a surface opposite to the display surface 201a, a small size auxiliary display 206 is provided.

As set forth above, the cellular telephone unit 500 is constructed by coupling the upper unit 200 and the lower unit 100 at respective base end portions by the biaxial hinge 300 which has two rotary shafts orthogonally intersecting for rotation independently with each other.

Figure 4A:
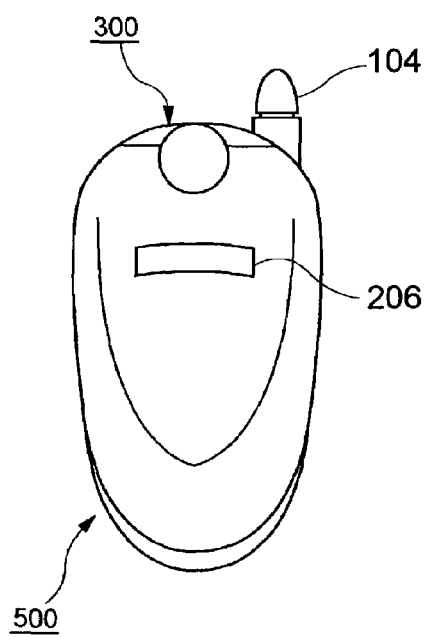
FIGS. 4A to 4D are illustrations showing various attitude position of the cellular telephone unit shown in FIG. 3.

FIG. 4A is an external view showing the cellular telephone unit in folded condition orienting the display surface 201a of the upper unit 200 in opposition to the operating portion of the lower unit 100. This is the condition that the conventional cellular telephone unit is in folded condition to be compact for convenience in carrying. On the other hand, the display surface 201a is not externally exposed and thus protected. At this condition, minimum but satisfactory information is displayed on the auxiliary display 206.

Figure 4B:
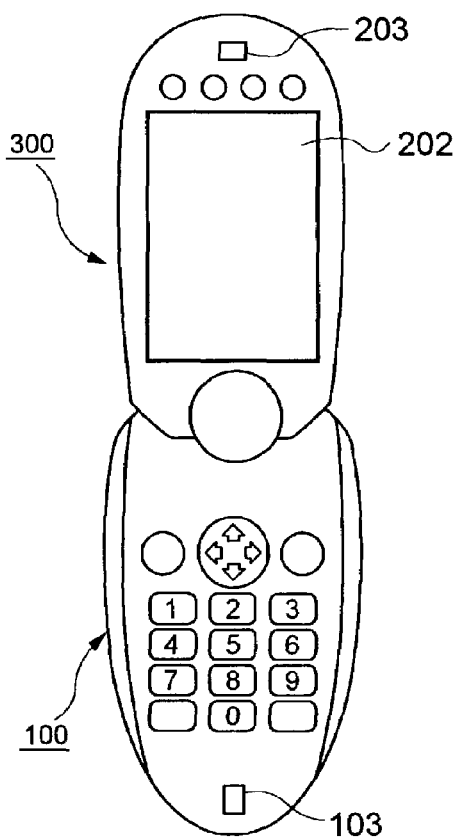

FIG. 4B is an external view showing the cellular telephone unit in fully raised condition which is normal calling position. At this condition, similarly to the conventional cellular telephone, checking of display, various operation and calling can be performed.

Figure 4C:
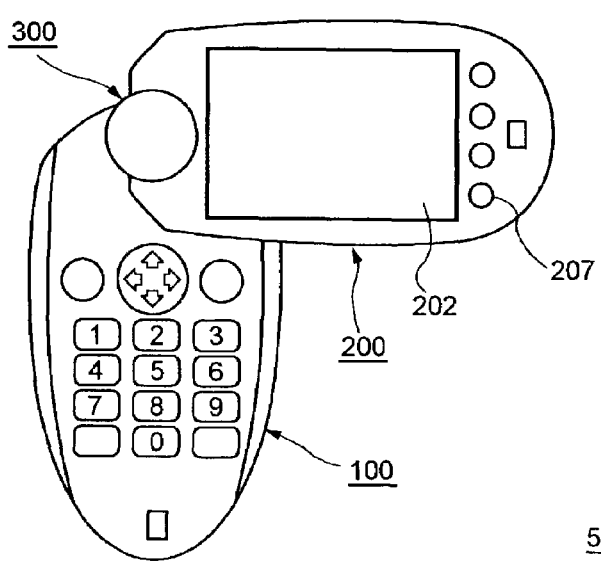

FIG. 4C is an external view showing the cellular telephone unit in a condition where the upper unit 200 is pivoted about 90° in clockwise fashion along a plane parallel to the operating surface 101a of the lower unit 100 from the condition shown in FIG. 4B. Then, the display 202 is arranged in laterally elongated fashion. It should be noted that this condition is also established even by pivoting the upper unit 200 in counterclockwise direction from the folded condition shown in FIG. 4D.

On the other hand, while not illustrated, the upper unit 200 may be pivoted about 90° in counterclockwise direction along the plane parallel to the display plane from the normal calling position (normal raised position) shown in FIG. 4B. Even in this condition, the upper unit 200 is oriented substantially perpendicular to the lower unit 100 in substantially the same plane. The display 202 is oriented in laterally elongated fashion in relation to the longitudinal direction of the operating surface 101a.

Furthermore, upon closing the cellular telephone unit 500, it is possible to orient the upper unit 200 to externally expose the display 202 which is normally placed internally concealed position.

Figure 4D:
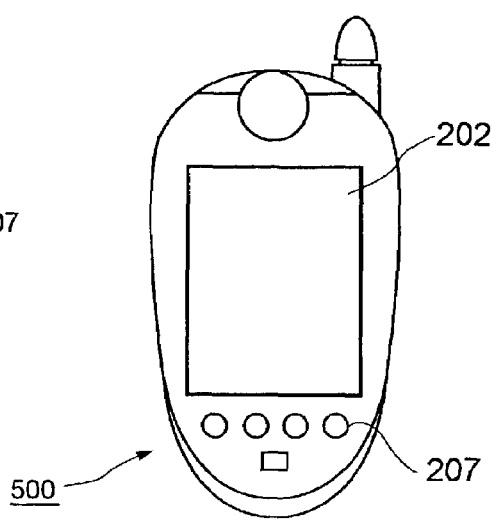

FIG. 4D is an external view of the cellular telephone unit 500 in the folded condition where the upper unit 200 is mated with the lower unit 100 in folded position as being oriented in reversed position directing the display surface 201a outwardly. For example, from the opened condition of the cellular telephone unit 200 as shown in FIG. 4B, the upper unit 200 is reversed to place the display surface 201a outward to and is placed in closed position relative to the lower unit 100 as shown in FIG. 4D. In this condition, the cellular telephone unit becomes compact for convenience in carrying and permits checking of the display content with maintaining folded condition. Also, in this condition, a second operating portion 207 is exposed externally, predetermined operation can be performed depending upon the display content using the second operating portion 207.

It is possible to detect the reversed condition of the upper unit 200 in folded condition shown in FIG. 4D by the angular position detecting portion 14, and to reverse the display content of the display 202 in up-side-down manner. At this time, among keys in the second operating portion 207, keys having directionality in process corresponding to the operation, such as direction key (cursor key) or the like, the process content may be adapted to the display direction. Thus, the display can be read as is and necessary operation can be performed with holding the cellular telephone unit 500 in hand in the same manner as the standard or normal folded condition.

Figure 6:
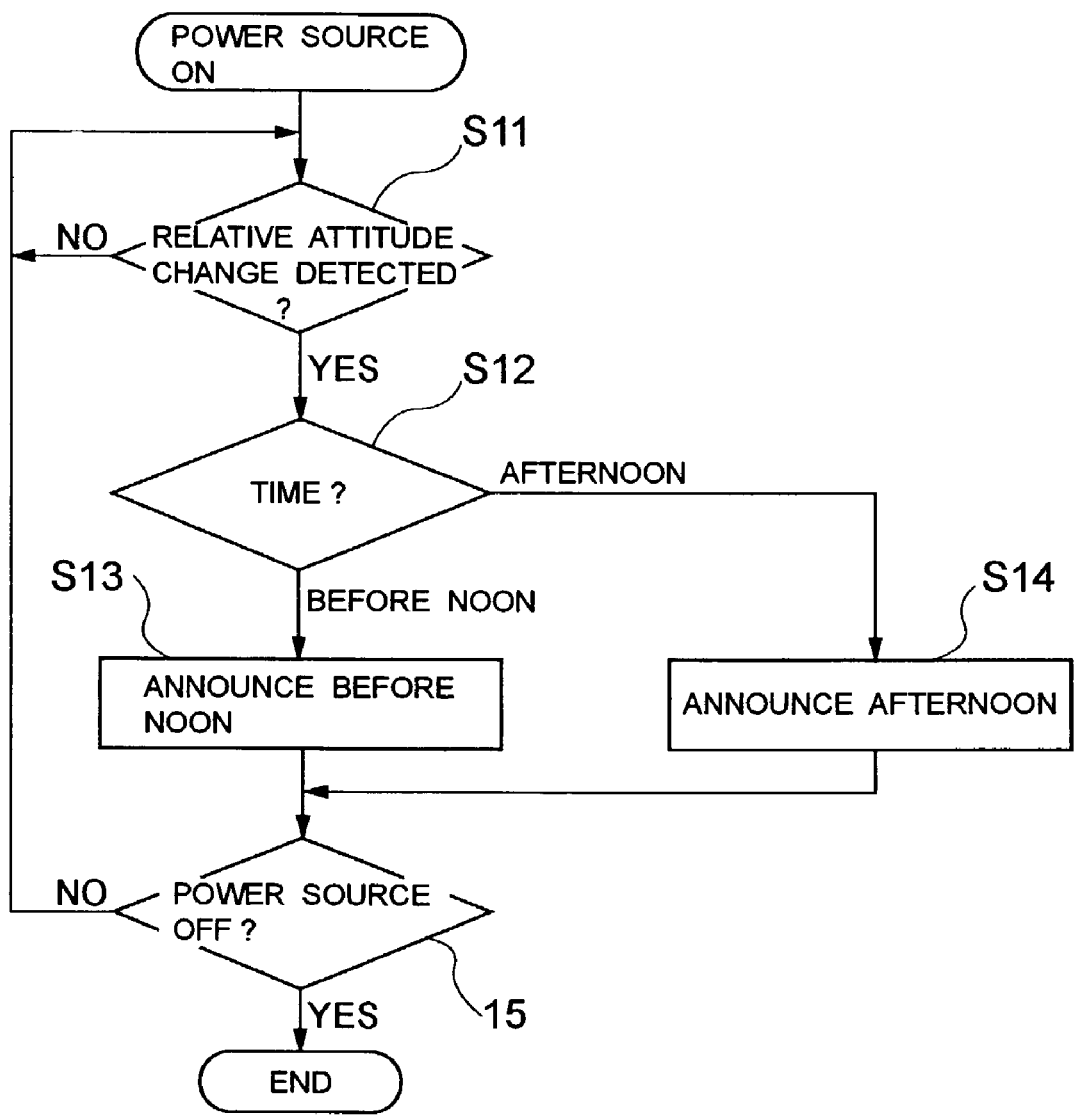
FIG. 6 is a flowchart showing example of another operation of the control portion of FIG. 1.

FIG. 5 is a flowchart showing one example of operation of the control portion of FIG. 1, and FIG. 6 is a flowchart showing another example of operation of the control portion 1 of FIG. 1. Operation of one embodiment of the portable information terminal according to the present invention will be discussed hereinafter with referring to FIGS. 1 to 6 in terms of the foregoing cellular telephone unit 500. It should be noted that the process operation shown in FIGS. 5 and 6 are realized by executing the program stored in the storage medium 8 in the control portion 1.

In the cellular telephone unit 500, when variation of the relative position (relative attitude) between the lower unit 100 and the upper unit 200 is detected by the opening and closing detecting portion 13 or the angular position detecting portion 14 via the magnetic sensor group, i.e. magnetic sensors 42a, 42b, 42c and generally identified in the disclosure by reference numeral 42 and the magnet group, i.e. magnets 52a and 52b and generally identified in the disclosure by reference numeral 52, the announcing control portion 15 performs announcement by at least one of the display 202, the auxiliary display 206, the speaker 203 and the announcing portion 7 (vibrator, LED, speaker and so forth).

For example, as relative position of the lower unit 100 and the upper unit 200, upon occurrence of change from one arbitrary position among FIGS. 4A to 4D to another position, an arbitrary melody (music) stored in the storage portion 6 is output for a predetermined period from the speaker 203. It should be noted that the melody (music) in the storage portion 6 can be set arbitrarily.

On the other hand, in the cellular telephone unit 500, variation of the relative position (relative attitude) of the lower unit 100 and the upper unit 200 is detected by the opening and closing detector 13 or the angular position detecting portion 14 through the magnetic sensor group 42 and the magnet group 52 (step S1 of FIG. 5), and detected variation of the relative position requires changing of operation mode of the cellular telephone unit (step S2 of FIG. 5), the announcing control portion 15 performs announcement by at least one of the display 202, the auxiliary display 206r, the speaker 203 and the announcing portion 7 (vibrator, LED, speaker or the like) (steps S4, S5, S7, S8 of FIG. 5).

For example, when the initial relative position of the lower unit 100 and the upper unit 200 is the calling mode shown in FIG. 4B and transition is caused to a game mode shown in FIG. 4C (change of operation mode is required), the arbitrary melody stored in the storage portion 6 is output for a predetermined period from the speaker 203 as one example of announcement.

Upon transition from calling mode of FIG. 4B to the game mode of FIG. 4C (steps 1, 2 of FIG. 5), the announcing control portion 15 outputs the arbitrary melody (music) stored in the storage portion 6 for a predetermined period from the speaker depending upon the judgment value of the battery remaining capacity judgment portion 17, as one example of announcement.

In this case, if the judgment value of the battery remaining capacity judgment portion 17 indicates large remaining capacity of the battery portion 4, the announcing control portion 15 makes judgment that the game can be played (step S6 of FIG. 5). Then, a melody (music) in game mode stored in the storage portion 6 is output from the speaker 203 for the predetermined period (step S7 of FIG. 5). Conversely, if the judgment value of the battery remaining capacity judgment portion 17 indicates small remaining capacity of the battery portion 4, the announcement control portion 15 makes judgment that playing game is not permissible (step S6 of FIG. 5), a melody stored in the storage portion 6 indicative of changing of mode is not permitted, is output for the predetermined period from the speaker 203 (step S8 of FIG. 5).

On the other hand, upon transition from the game mode of FIG. 4C to the calling mode of FIG. 4D (steps S1 and S2 of FIG. 5), the announcement control portion 15 outputs arbitrary melody (music) stored in the storage portion 6 for a predetermined period from the speaker 203 as one example of announcement depending upon the judgment value of the electric field intensity judgment portion 11.

In this case, when the announcement control portion 15 makers judgment that the judgment value of the electric field judgment portion 11 indicates capability of calling (step S3 of FIG. 5), the melody (music) stored in the storage portion 6 indicative of calling mode is output from the speaker 203 for the predetermined period (step S4 of FIG. 5). Conversely, when the announcement control portion 15 makes judgment that the judgment value of the electric field intensity judgment portion 11 indicates impossibility of calling (step S3 of FIG. 5), a melody (music) stored in the storage portion 6 indicative that changing of mode is not permissible, is output from the speaker 203 for the predetermined period.

The announcement control portion 15 repeatedly performs the foregoing process operation until the power source of the own terminal is turned OFF (step 9 of FIG. 5). While the foregoing discussion has been given in terms of switching of the operation mode between the calling mode and the game mode, it is possible to adapt to the schedule management mode, browser or electronic mail mode.

In the cellular telephone unit 500 set above, when variation of the relative position (relative attitude) between the lower unit 100 and the upper unit 200 is detected by the opening and closing detecting portion 13 or the angular position detecting portion 14 via the magnetic sensor group, i.e. magnetic sensors 42a, 42b, 42c and generally identified in the disclosure by reference numeral 42 and the magnet group, i.e. magnets 52a and 52b and generally identified in the disclosure by reference numeral 52, the announcing control portion 15 performs announcement by at least one of the display 202, the auxiliary display 206, the speaker 203 and the announcing portion 7 (vibrator, LED, Speaker and so forth) according to the output value of the timer portion 5.

For example, when the relative position of the lower unit 100 and the upper unit 200 is transited from one of positions shown in FIGS. 4A to 4D to another position (step S11 of FIG. 6), when the announcement control port-ion 15 makes judgment that the output value of the timer portion 5 indicate before noon (step S12 of FIG. 6), a melody (music) stored in the storage portion 6 indicative of before noon is output through the speaker 203 for the predetermined period (Step S13 of FIG. 6). Conversely, when the announcement control portion 15 makes judgment that the output value of the timer portion 5 indicate afternoon (step S12 of FIG. 6), a melody (music) stored in the storage portion 6 indicative of afternoon is output through the speaker 203 for the predetermined period (Step S14 of FIG. 6). The announcement control portion 15 repeatedly performs the foregoing process until the power source of the own terminal is turned OFF (step S15 of FIG. 6).

As set forth above, by providing the announcement control portion 15 detecting opening and closing or pivoting motion of the units, the operation modes can be appropriately recognized with respect to the portable information terminal having biaxial hinge which permits various functions and various conditions (attitude).

It should be noted that the shown embodiment has been discussed in terms of the cellular telephone unit 500, it is also possible to apply the present invention even for other portable terminal, such as PDA (personal digital assistant) and so on. On the other hand, while the shown embodiment has been discussed to independently perform process operation shown in FIGS. 5 and 6, it is possible to perform operation by combining these processes.

As set forth above, the present invention achieves appropriate recognition of the operation mode in the construction having various functions and various conditions (attitudes) in the foldable type portable information terminal, in which the upper unit having the display screen in either of the upper or lower surfaces and the lower unit having the operation surface in either upper or lower surfaces are coupled for opening and closing and for pivoting by externally announcing variation of relative attitude of the upper unit and the lower unit as detected.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

What is claimed is:

1. A foldable type portable information terminal comprising:
   an upper unit having a display screen;
   a lower unit having an operation surface, wherein said upper and lower units are coupled for opening and closing and for pivoting;
   a detector for detecting variation of relative attitude of said upper unit and said lower unit;
   an operation mode judgment unit for detecting variation of operation mode of said terminal;
   a battery remaining capacity detection unit for detecting remaining capacity of a battery of said terminal;
   an electric field intensity detecting unit for detecting communication condition of said terminal; and
   an announcing unit for externally announcing whether or not a state of said terminal is adaptable for a desired operation mode when said detector detects said variation of relative attitude of said upper unit and said lower unit and said operation mode judgment unit detects said variation of operation mode of said terminal,
   wherein said announcing unit performs an external announcement of whether or not said state of said terminal is adaptable for said desired operation mode in accordance with said remaining capacity of said battery detected by said battery remaining capacity detection unit when said detector detects said variation of relative attitude of said upper unit and said lower unit and said operation mode judgment unit detects said variation of operation mode of said terminal to an application program, and
   wherein said announcing unit also performs an external announcement of whether or not said state of said terminal is adaptable for a desired calling mode in accordance with said communication condition detected by said electric field intensity detecting unit when said detector detects said variation of relative attitude of said upper unit and said lower unit and said operation mode judgment unit detects said variation of operation mode of said terminal to said desired calling mode.

2. The foldable type portable information terminal as set forth in claim 1,
   wherein said announcing unit performs the external announcement when both variation of relative attitude of said upper unit and said lower unit is detected by said detector and variation of operation mode is detected by said operation mode judgment unit.

3. The foldable type portable information terminal as set forth in claim 1, further comprising a timer for measuring a time, wherein said announcing unit performs announcement based on time information output by said timer.

4. The foldable type portable information terminal as set forth in claim 1, wherein said announcing unit performs announcement by at least one of light, sound and vibration.

5. A condition announcing method for a foldable type portable information terminal having an upper unit and a lower unit that are coupled for opening and closing and for pivoting, the method comprising:
   detecting variation of relative attitude of said upper unit and said lower unit;
   detecting variation of operation mode of the terminal;
   detecting remaining capacity of a battery of said terminal;
   detecting communication condition of said terminal;
   externally announcing whether or not a state of said terminal is adaptable for a desired operation mode when said variation of relative attitude of said upper unit and said lower unit is detected and said variation of operation mode of said terminal is detected;
   externally announcing whether or not said state of said terminal is adaptable for said desired operation mode in accordance with said detected remaining capacity of said battery when said variation of relative attitude of said upper unit and said lower unit is detected and said variation of operation mode of said terminal is detected, and
   externally announcing whether or not said state of said terminal is adaptable for a desired calling mode in accordance with said detected communication condition when said variation of relative attitude of said upper unit and said lower unit is detected and said variation of operation mode of said terminal to said desired calling mode is detected.

6. The condition announcing method as set forth in claim 5, wherein the external announcement is performed when both variation of relative attitude of said upper unit and said lower unit and variation of operation mode are detected.

7. The condition announcing method as set forth in claim 5, further comprising measuring a time,
   wherein the external announcement is performed based on the measured time.

8. The condition announcing method as set forth in claim 5, wherein the external announcement is performed by at least one of light, sound and vibration.

9. A program on a computer readable medium for the purpose of executing on a computer a method for announcing a condition for a foldable type portable information terminal having an upper unit and a lower unit that are coupled for opening and closing and for pivoting, the method comprising:
   detecting variation of relative attitude of said upper unit and said lower unit;
   detecting variation of operation mode of the terminal; and
   detecting remaining capacity of a battery of said terminal;
   detecting communication condition of said terminal;
   externally announcing whether or not a state of said terminal is adaptable for a desired operation mode when said variation of relative attitude of said upper unit and said lower unit is detected and said variation of operation mode of said terminal is detected:
   externally announcing whether or not said state of said terminal is adaptable for said desired operation mode in accordance with said detected remaining capacity of said battery when said variation of relative attitude of said upper unit and said lower unit is detected and said variation of operation mode of said terminal is detected, and
   externally announcing whether or not said state of said terminal is adaptable for a desired calling mode in accordance with said detected communication condition when said variation of relative attitude of said upper unit and said lower unit is detected and said variation of operation mode of said terminal to said desired calling mode is detected.

10. A foldable type cellular telephone unit having an upper unit and a lower unit that are coupled for opening and closing and for pivoting, the cellular telephone unit comprising:
    a detector for detecting variation of relative attitude of said upper unit and said lower unit;
    an operation mode judgment unit for detecting variation of operation mode of the cellular telephone unit;
    a battery remaining capacity detection unit for detecting remaining capacity of a battery of the cellular telephone unit;
    an electric field intensity detecting unit for detecting communication condition of the cellular telephone unit; and
    an announcing unit for externally announcing whether or not a state of said terminal is adaptable for a desired operation mode when said detector detects said variation of relative attitude of said upper unit and said lower unit and said operation mode judgment unit detects said variation of operation mode of said terminal,
    wherein said announcing unit performs an external announcement of whether or not said state of said terminal is adaptable for said desired operation mode in accordance with said remaining capacity of said battery detected by said battery remaining capacity detection unit when said detector detects said variation of relative attitude of said upper unit and said lower unit and said operation mode judgment unit detects said variation of operation mode of said terminal to an application program, and
    wherein said announcing unit also performs an external announcement of whether or not said state of said terminal is adaptable for a desired calling mode in accordance with said communication condition detected by said electric field intensity detecting unit when said detector detects said variation of relative attitude of said upper unit and said lower unit and said operation mode judgment unit detects said variation of operation mode of said terminal to said desired calling mode.

11. The foldable type cellular telephone unit as set forth in claim 10,
    wherein said announcing unit performs the external announcement when both variation of relative attitude of said upper unit and said lower unit is detected by said detector and variation of the operation mode is detected.

12. The foldable type cellular telephone unit as set forth in claim 10, further comprising a timer for measuring a time,
    wherein said announcing unit performs announcement based on time information output by said timer.

13. The foldable type cellular telephone unit as set forth in claim 10, wherein said announcing unit performs announcement by at least one of light, sound and vibration.

* * * * *